United States Patent [19]

Cunningham

[11] Patent Number: 4,471,402

[45] Date of Patent: Sep. 11, 1984

[54] DISCONNECTOR FOR SURGE ARRESTER

[75] Inventor: Francis V. Cunningham, Western Springs, Ill.

[73] Assignee: Joslyn Mfg. and Supply Co., Chicago, Ill.

[21] Appl. No.: 344,525

[22] Filed: Feb. 1, 1982

[51] Int. Cl.[3] ..... H02H 9/04

[52] U.S. Cl. ..... 361/125; 361/135; 361/134; 315/36

[58] Field of Search ..... 361/135, 136, 134, 125, 361/117, 127, 128; 315/36; 313/231.1

[56] References Cited

U.S. PATENT DOCUMENTS

| | | | |
|---|---|---|---|
| 2,860,210 | 11/1958 | Stoelting et al. | 361/125 X |
| 3,017,539 | 1/1962 | Robinson | 361/125 |
| 3,679,938 | 7/1972 | Carothers et al. | 361/125 |
| 3,710,212 | 1/1973 | Marek et al. | 361/125 |
| 3,869,650 | 3/1975 | Cunningham et al. | 361/128 X |
| 4,204,238 | 5/1980 | Stetson | 361/134 X |
| 4,321,649 | 3/1982 | Gilberts | 361/129 X |

OTHER PUBLICATIONS

Product Article by General Electric, "Alugard Distribution Surge Arresters", Publication–GEA–9309B, Oct. 1973.

*Primary Examiner*—Patrick R. Salce

*Attorney, Agent, or Firm*—Mason, Kolehmainen, Rathburn & Wyss

[57] ABSTRACT

A disconnector for a surge arrester explosively separates an electrical lead wire, normally a ground lead wire, from the arrester to prevent a permanent fault and to provide an indication of a failed arrester. The disconnector includes an elongated, frangible insulating housing having an elongated opening disposed along and parallel to the longitudinal axis of the insulating housing; a first electrically conductive terminal disposed at a first end of the opening; a second electrically conductive terminal disposed at a second end of the opening; means for forming an arc gap disposed between the first and second terminals, including an arc gap spacer and an arc electrode being either generally flat or including a raised portion; and an explosive cartridge disposed between the first and second terminals and in contact with the arc electrode. The metallic casing of the explosive cartridge holds an explosive charge and may include a generally flat surface parallel to the longitudinal axis of the explosive cartridge for contacting a generally flat surface of the arc electrode, thereby providing means for controlling the transfer of arc generated heat to the explosive charge to assure that the explosive charge will forcefully explode to separate a ground lead wire from a damaged surge arrester.

26 Claims, 9 Drawing Figures

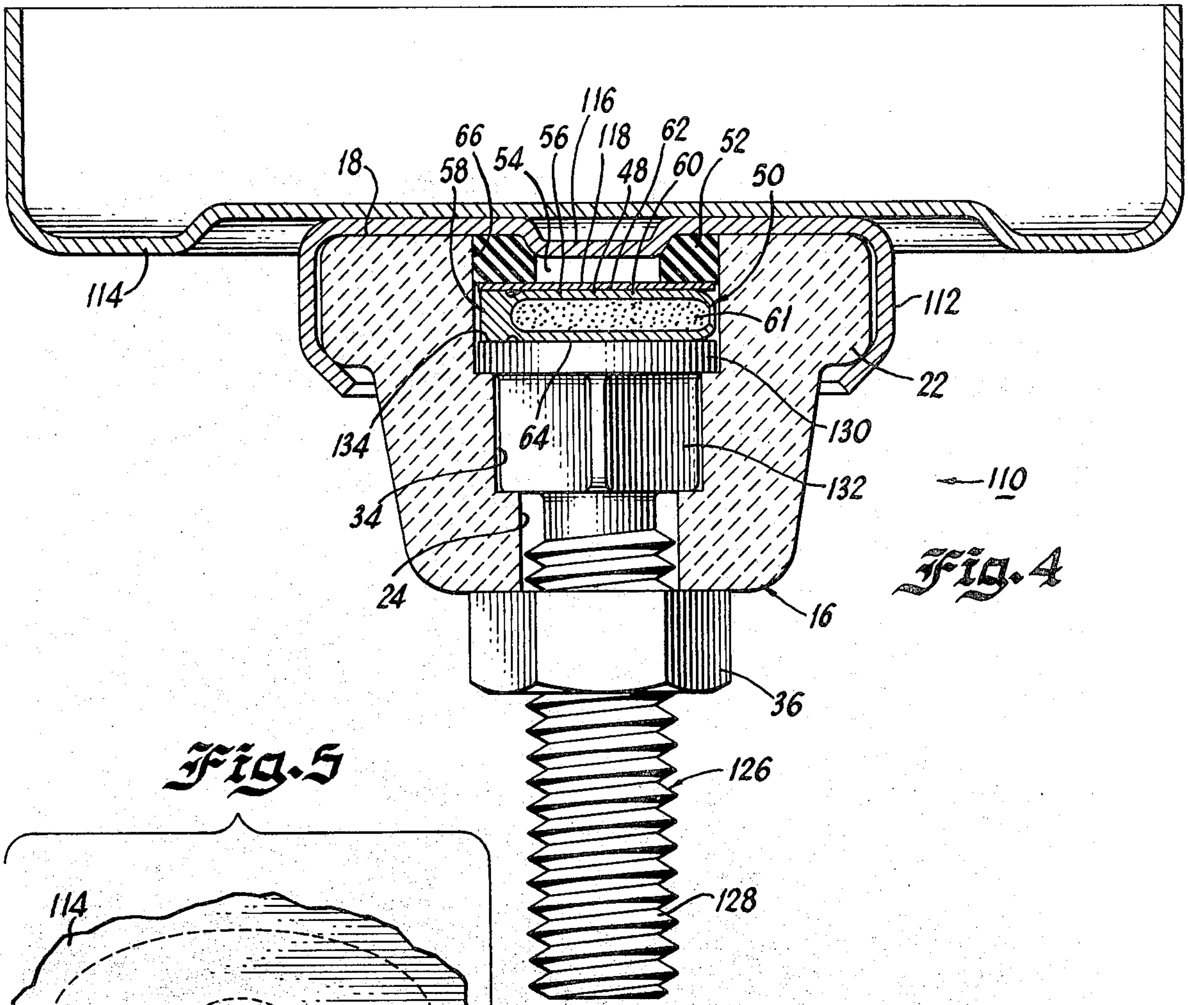
Fig. 4
Fig. 5
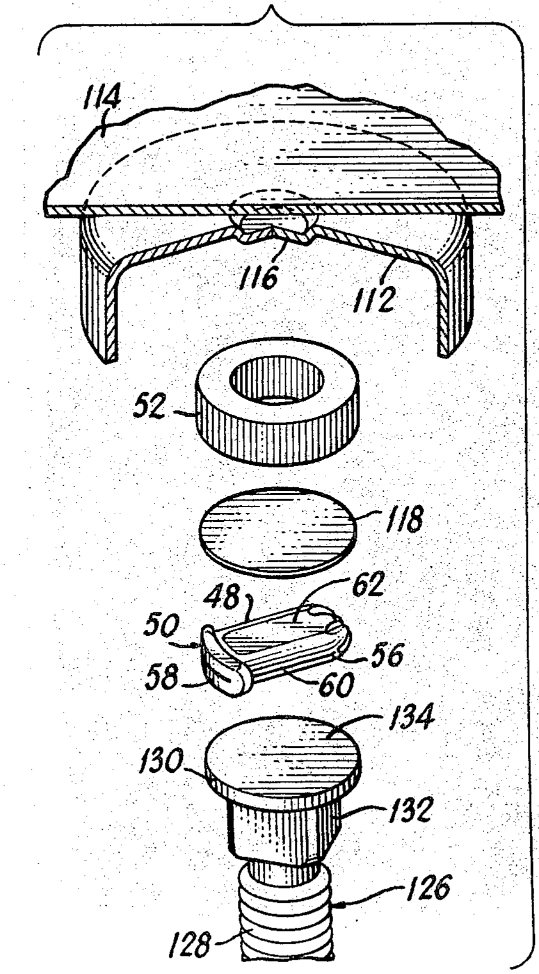
Fig. 6
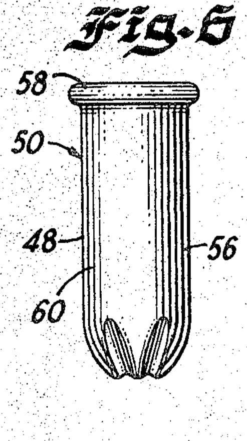
Fig. 8
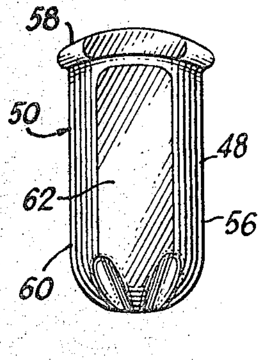
Fig. 7
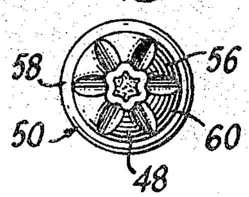
Fig. 9
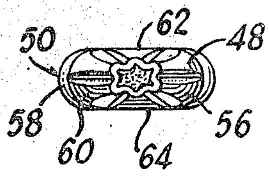

DISCONNECTOR FOR SURGE ARRESTER

BACKGROUND OF THE INVENTION

The device of the present invention generally relates to apparatus for protecting electrical equipment from damage or destruction due to the presence of electrical overvoltage surges, commonly referred to as a surge arrester, and, more particularly, to a new and improved device for separating an electrical ground lead wire from a damaged surge arrester, commonly referred to as a disconnector.

B. Description of the Prior Art

A surge or lightning arrester is commonly electrically connected across a comparatively expensive piece of electrical equipment to shunt overvoltage surges, for example, overvoltage surges due to lightning strokes, to ground to thereby protect the piece of electrical equipment from damage or destruction. Occasionally, the surge arrester itself is damaged, for example, by a relatively large overvoltage surge and may then continuously conduct power system follow current subsequent to the overvoltage surge to ground through a ground lead wire attached to the surge arrester. When the damaged surge arrester is equipped with a ground lead wire explosive disconnector, the disconnector is designed to react to the continuous current flow and to explosively separate the ground lead wire from the damaged arrester. Typical prior art ground lead disconnectors are disclosed in U.S. Pat. No. 3,869,650 and in the patents referred to therein.

Typical prior art disconnectors contain an explosive cartridge that, when sufficiently heated, explodes and separates a ground lead wire from a damaged arrester. Some problems with typical prior art disconnectors relate to the control of the rate of heating of the explosive cartridge. One of the problems has been to provide a disconnector which can safely conduct either lightning or surge currents exceeding 100,000 amperes or half cycle follow currents exceeding 500 amperes, yet which will properly disconnect a ground lead wire from a damaged arrester when conducting only twenty amperes for a specified time. Another problem has been to assure that the explosive cartridge charge will forcefully explode to properly disconnect a ground lead wire from a damaged arrester. Under some conditions, the explosive cartridge charge may burn slowly and not forcefully explode to separate the ground lead wire from a damaged arrester. For example, electrical arcing to a single spot on an explosive cartridge metallic casing can, under specific conditions, burn through the casing and ignite the explosive charge before the charge reaches an explosive temperature. As a result, the explosive charge may burn out slowly and fail to separate a ground lead wire from a damaged arrester.

Several U.S. patents disclose disconnectors that are designed to solve one or more of the above problems. For example, U.S. Pat. No. 4,204,238 discloses a disconnector that fully encloses the elongated body of an explosive cartridge 22 and permits arcing only to a refractory metal coating 23 on the top section or head of the explosive cartridge 22. U.S. Pat. No. 3,369,091 discloses a disconnector in which an explosive cartridge 38 is enclosed within a resistance member 46 and is designed to permit arcing to a copper cap 44 fitted to an end of the explosive cartridge 38. U.S. Pat. No. 3,679,938 discloses a disconnector that is designed to improve the reliability of the explosive cartridge by providing for arcing to the shank or body portion of the explosive cartridge proximate to the center of mass of the explosive charge in the cartridge. In a related commercial embodiment of the disconnector disclosed in the above U.S. Pat. No. 3,679,938, a metallic sleeve surrounds the body or shank portion of the explosive cartridge and forms one of the gap electrodes. U.S. Pat. No. 3,710,212 discloses a disconnector in which an explosive cartridge is encased within both a metallic casing 31 and a resistive elastomeric gasket 32 and in which arcing may occur to the casing 31, but may also switch directly to the exposed head 29 of the explosive cartridge. Finally, U.S. Pat. No. 2,824,928 discloses a disconnector that provides for deliberate arc switching wherein arcing initially occurs in a spaced series arc gap 24 and switches progressively along a metallic electrode 22 to eventually contact the exposed head of an explosive cartridge 46 disposed in an aperture 43 of the electrode 22.

SUMMARY OF THE INVENTION

An object of the present invention is to provide a new and improved disconnector for a surge arrester.

Another object of the present invention is to provide a new and improved means for controlling the transfer of arc generated heat to an explosive charge in an explosive cartridge in a disconnector.

Another object of the present invention is to provide a new and improved arc gap spacer and new and improved gap electrodes in a disconnector.

Another object of the present invention is to provide a new and improved explosive cartridge casing in a disconnector Another object of the present invention is to provide a new and improved method of manufacturing a ground lead wire disconnector for a surge arrester.

Briefly, the device of the present invention comprises a disconnector for separating an electrical ground lead wire from a damaged surge arrester. The disconnector includes an elongated frangible insulating housing having an elongated opening; a first electrically conductive terminal disposed at a first end of the opening; a second electrically conductive terminal disposed at the other end of the opening; and means for forming an arc gap disposed between the first and second terminals, including a resistive arc gap spacer and a gap electrode. The gap electrode may be entirely flat, may include a raised portion, and may include an aperture for venting gases. An explosive cartridge for fracturing the insulating housing includes a cartridge casing that may be physically modified along the body portion thereof to form a generally flat contacting surface. The generally flat surface of the cartridge casing is disposed in direct physical contact with a generally flat surface of the gap electrode to assure that the explosive charge of the cartridge will forcefully explode to fracture the elongated housing and separate the ground lead wire from a damaged surge arrester.

BRIEF DESCRIPTION OF THE DRAWING

The above and other objects and advantages and novel features of the present invention will become apparent from the following detailed description of two embodiments of the invention illustrated in the accompanying drawing wherein:

FIG. 4 is a partially elevational, partially cross-sectional view of an alternative embodiment of a disconnector contructed in accordance with the principles of the present invention;

FIG. 5 is a fragmentary, exploded, perspective view of the device of FIG. 4;

FIG. 6 is an enlarged, front perspective view of an explosive cartridge used in the manufacture of the devices of FIGS. 1 through 5;

FIG. 7 is an enlarged, bottom perspective view of the device of FIG. 6;

FIG. 8 is an enlarged, front perspective view of an explosive cartridge physically modified in accordance with the principles of the present invention; and FIG. 9 is an enlarged, bottom perspective view of the device of FIG. 8.

DESCRIPTION OF THE PREFERRED EMBODIMENT

Figure 1:
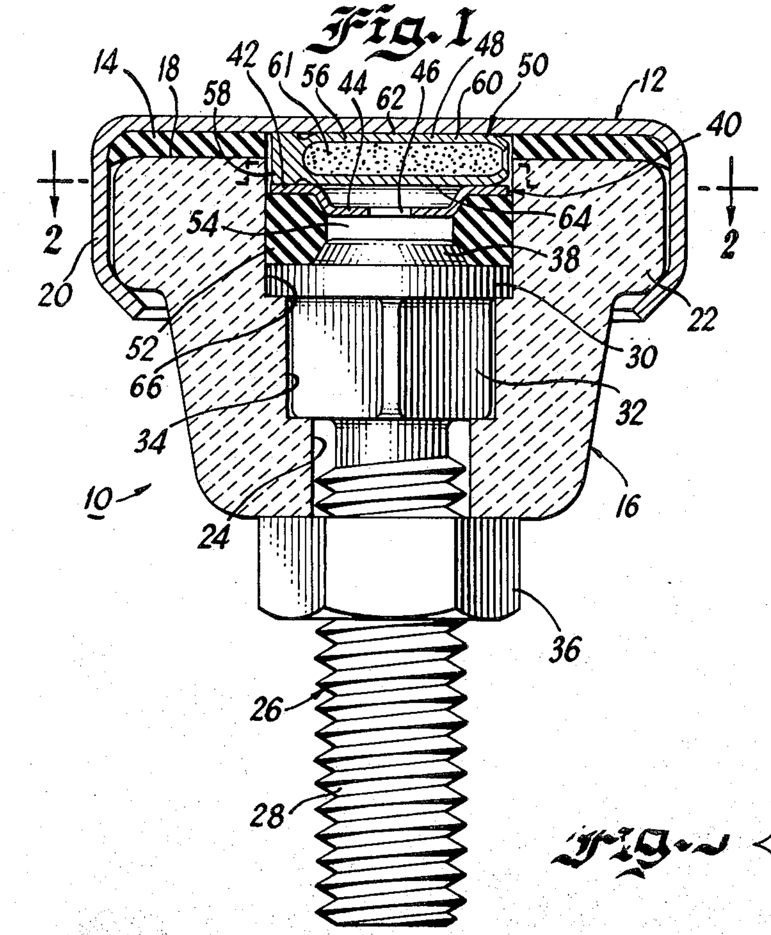
FIG. 1 is a partially elevational, partially cross-sectional view of a preferred embodiment of a disconnector constructed in accordance with the principles of the present invention.
Figure 2:
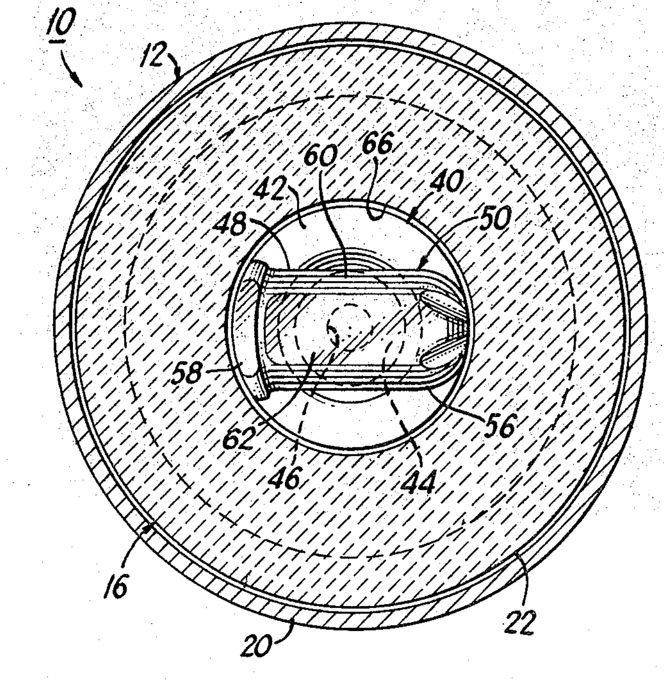
FIG. 2 is a top cross-sectional view of the device of FIG. 1 taken along line 2—2 of FIG. 1.
Figure 3:
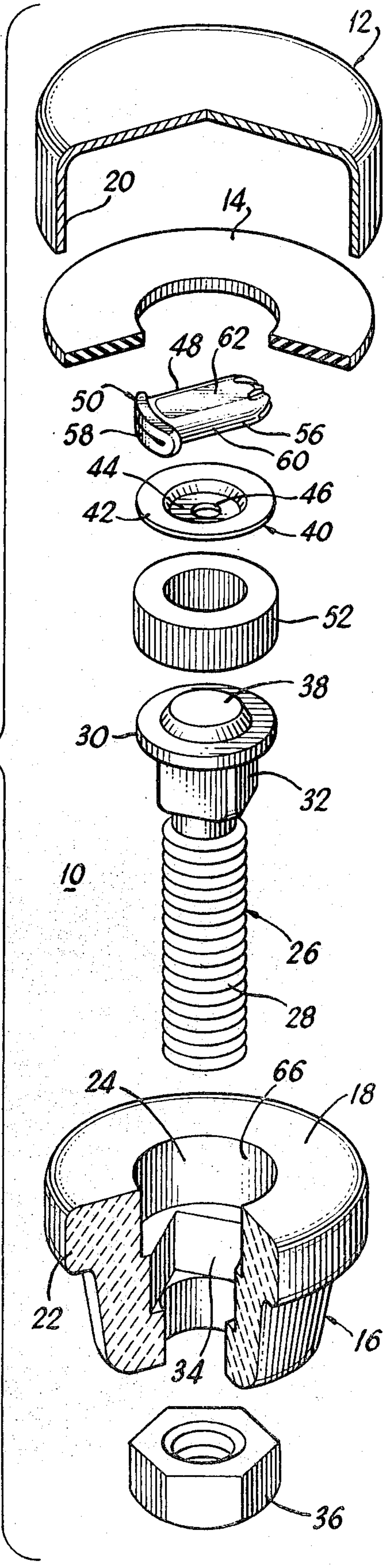
FIG. 3 is an exploded, perspective view of the device of FIG. 1.

Referring to the drawing and initially to FIGS. 1 through 3, there is illustrated a new and improved disconnector 10 constructed in accordance with the principles of the present invention. The disconnector 10 is designed to be connected to a longitudinal end of a surge arrester (not illustrated) remote from the end of the surge arrester to which a power system electrical lead wire is attached.

The disconnector 10 includes a generally cup shaped, sealing cap 12 formed of a conductive metal that functions as both a first electrically conductive terminal 12 of the disconnector 10 and as a convenient member for attaching the the disconnector 10 to the longitudinal end of a surge arrester, for example, by welding thereto. The disconnector 10 further includes an elastomeric sealing gasket 14 disposed at the top end of a frangible, elongated, insulating housing 16 preferably formed of a phenolic material and used for physically supporting the components of the disconnector 10. The housing 16 includes an upper surface 18 for seating and engaging the gasket 14. The gasket 14 is compressed by downwardly extending, circumferentially disposed, side portions 20 of the sealing cap 12 that are formed under and in bearing contact with the lower edge of a flange portion 22 of the housing 16 that extends radially outwardly from and perpendicular to the longitudinal axis of an elongated opening 24 through the housing 16.

The disconnector 10 further includes a ground lead terminal 26 that functions as a second electrically conductive terminal disposed at an end of the housing 16. The terminal 26 includes a threaded portion 28 for threadedly engaging a ground lead wire connector and a head portion 30 disposed within the opening 24. The head portion 30 includes polygonally shaped, downwardly extending side portions 32 that are received within a complementarily shaped, elongated portion 34 of the opening 24 thereby to prevent the rotation of the terminal 26 after assembly within the disconnector 10. The terminal 26 is held in place within the housing 16 by the engagement of a nut 36 with the threaded portion 28 and with the lowermost portion of the housing 16. The head 30 of the terminal 26 further includes a centrally disposed, upraised or pedestal portion 38 that functions as a first gap electrode 38.

In accordance with a further important feature of the present invention, the disconnector 10 includes a second, electrically conductive gap electrode 40. In the preferred embodiment, the electrode 40 is formed of brass 0.020 inches thick, and includes a first, radially outwardly disposed, generally flat portion 42 and a second, centrally disposed, generally flat, upraised or pedestal portion 44 that functions as a surface for a terminal of an electrical arc. Centrally disposed within the pedestal portion 44 is an aperture 46 that permits the hot gases created by an electrical arc to vent or pass to and envelop the center section of an explosive cartridge 50.

In accordance with a further important feature of the present invention, the spacing between the gap electrodes within the disconnector 10 is defined and maintained by a resistor 52 formed, in the preferred embodiment, from a conductive elastomeric material, such as carbon impregnated rubber. The resistor 52, in addition to defining and maintaining the spacing of an arc gap 54 between the gap electrodes 38 and 40, serves in normal operation to maintain the voltage across the arc gap 54 at a low voltage level. That is, normal charging and leakage currents are discharged by the resistor 52. An overvoltage surge causes an electrical arc to occur across the arc gap 54.

The cartridge 50 includes a cartridge casing 56 formed 0.008 inches thick brass and having a head portion 58 and an elongated body portion 60. In accordance with an important feature of the present invention (FIGS. 6–9), the cartridge casing 56 is physically modified prior to assembly within the disconnector 10 to form generally flat contacting surfaces 62 and 64 along the body portion 60, thereby forming a flattened cartridge 50. The cartridge 50 is physically modified both axially along its longitudinal axis and radially about its longitudinal axis (FIGS. 2, 6 and 8) so that the flattened cartridge 50 will fit within an envelope determined by the diameter of an upper portion 66 of the opening 24 (FIGS. 1–3).

Upon the occurrence of an overvoltage surge, an electrical arc will appear across the arc gap 54; and both surge current and electrical system follow current will pass through the disconnector, conducted by the electrical series combination of the terminal 12, flattened cartridge 50, electrode 40, the electrical arc across the gap 54 and the unitary electrode 38 and terminal 26. Heat generated by the electrical arc will be conducted by the centrally disposed, pedestal portion 44 to the radially outwardly disposed, peripheral portion 42 of the electrode 40 for distribution to spaced apart portions of the casing 56 of the flattened cartridge 50. This distribution of heat generated by the electrical arc allows more of an explosive cartridge charge 61 of the cartridge 50 to be heated to its explosive temperature, thereby assuring that explosion, rather than burn out, will occur. In addition, the aperture 46 in the electrode 40 allows the hot gases created by the electrical arc to pass through the aperture 46 and envelope the center section of the body portion 60 of the cartridge casing 56 to further enhance and assure that the heat generated by the electrical arc is transmitted to and evenly distributed across the cartridge casing 56, while the cartridge casing 56 is shielded from direct contact with the electrical arc.

In an alternative embodiment of the present invention (FIGS. 4–5), a disconnector 110 includes a generally cup-shaped, sealing cap 112 that functions as a first electrically conductive terminal 112 of the disconnector 110 and that provides a surface for attachment by any suitable means, such as spot welding, to a metallic end cap 114 of a surge arrester (not illustrated). In accordance with an important feature of the present invention, the terminal 112 includes a first gap electrode 116 integrally formed as a centrally disposed, upraised or pedestal portion 116 of the terminal 112. In accordance with a further important feature of the present invention, a generally flat conductive metal plate 118 forms a second gap electrode 118 spaced from the first gap electrode 116 by the resistor 54. A ground lead terminal 126 includes a threaded portion 128 and a head portion 130. The head portion 30 includes polygonally shaped, downwardly extending side portions 132 and a generally flat, upper surface 134. Disposed between the surface 134 and the gap electrode 118 is the flattened cartridge 50. Upon the occurrence of an overvoltage surge, an electrical arc is formed across the arc gap 54 between the electrodes 116 and 118. Both surge current and electrical system follow current is then conducted through the disconnector by the series combination of the unitary terminal 112 and gap electrode 116, the electrical arc across the gap 54, the gap electrode 118, the flattened cartridge 50 and the terminal 126. Heat generated by the electrical arc will be conducted by the flat plate electrode 118 and distributed across the heat portion 58 and body portion 60 of the casing 56, specifically across the generally flat contacting surface 62 of the body portion 60 that abuts the electrode 118. This distribution of heat across major portions of the casing 56 allows for more of the cartridge charge 61 to be heated to its explosive temperature before actual explosion occurs, thereby assuring that explosion, rather than burn out, will occur. In addition to transmitting and distributing the heat generated by the electrical arc to the casing 56, the gap electrode 118 shields the cartridge 50 from direct contact with the electrical arc.

Obviously, many modifications and variations of the present invention are possible in light of the above disclosure. Thus, it is to be understood that, within the scope of the appended claims, the invention may be practiced otherwise than as specifically described above.

What is claimed and desired to be secured by Letters Patent of the United States is:

1. A disconnector for a surge arrester comprising
an insulating housing having an opening,
a first electrically conductive terminal disposed at a first end of said opening,
a second electrically conductive terminal disposed at a second end of said opening,
means for forming an arc gap disposed between said first and second terminals,
said arc gap forming means comprising an arc gap spacer and an arc electrode having a first generally flat surface and a second generally flat surface,
said arc gap spacer abutting said first generally flat surface, and
an explosive cartridge,
said explosive cartridge being disposed between and abutting both said second generally flat surface and a surface of one of said first and second conductive terminals.

2. A disconnector as recited in claim 1 wherein said explosive cartridge includes a head portion and an at least partially flattened elongated body portion.

3. A disconnector as recited in claim 1 wherein said arc gap spacer comprises an electrical resistor having a selected electrical resistance.

4. A disconnector as recited in claim 1 wherein said arc gap spacer is formed of an elastomeric material.

5. A disconnector as recited in claim 1 wherein said first generally flat surface comprises means for receiving an electrical arc, said electrical arc receiving means being spaced from said explosive cartridge and from said second generally flat surface.

6. A disconnector as recited in claim 5 wherein said first generally flat surface includes an aperture therethrough.

7. A disconnector for a surge arrester comprising
an insulating housing having an opening,
a first electrically conductive terminal disposed at a first end of said opening,
a second electrically conductive terminal disposed at a second end of said opening,
a metallic casing disposed between said terminals,
an explosive charge disposed within said casing,
an arc gap disposed between said first and second terminals, and
means for controlling the ignition of said charge,
said ignition controlling means comprising a generally flat metallic arc gap electrode having a centrally disposed portion for receiving an electrical arc and for shielding said casing from said electrical arc and further comprising another integrally formed portion of said arc gap electrode disposed in physical contact with said casing for conducting heat from said centrally disposed portion to said casing.

8. A disconnector as recited in claim 7 wherein said centrally disposed portion is spaced from said casing.

9. A disconnector as recited in claim 8 wherein said centrally disposed portion includes an aperture therethrough for venting expanding gases caused by an electrical arc.

10. An improved surge arrester disconnector of the type having an insulating housing, an arc gap, a metallic casing, an explosive charge within said casing, an electrically conductive terminal physically connected to said housing and means for controlling the ignition of said charge, the improvement comprising
said controlling means including a generally flat portion of a metallic arc gap electrode disposed in contact with at least two spaced apart portions of said metallic casing.

11. An improved disconnector as recited in claim 10 wherein said arc gap electrode includes a raised portion spaced from said metallic casing and defining an arc surface of said arc gap.

12. An improved disconnector as recited in claim 11 wherein said raised portion includes an aperture defining a gas vent.

13. An improved disconnector as recited in claim 11 wherein said ignition controlling means further includes an arc gap spacer and wherein said arc gap electrode and said metallic casing are maintained in an abutting relationship by said arc gap spacer.

14. An improved disconnector as recited in claim 13 wherein said arc gap spacer comprises an electrical resistor.

15. An improved disconnector as recited in claim 14 wherein said arc gap spacer is made of elastomeric material.

16. An improved surge arrester disconnector of the type having an insulating housing, an arc gap, an explosive charge, an electrical terminal physically connected to said housing and means for controlling the ignition of said explosive charge, the improvement comprising said ignition controlling means comprising a metallic casing having an elongated body and containing said explosive charge, said elongated body including an elongated flattened surface extending along the length of said elongated body and forming a heat transfer surface on said elongated body.

17. An improved disconnector as recited in claim 16 wherein said ignition controlling means further comprises a metallic arc gap electrode having a flat surface abutting said flattened surface of said elongated body portion of said cartridge casing.

18. An improved disconnector as recited in claim 17 wherein said arc gap electrode includes a raised portion spaced from said cartridge casing and defining an arc surface of said arc gap.

19. A disconnector for a surge arrester comprising an insulating housing having an opening, a first electrically conductive terminal disposed at a first end of said opening, a second electrically conductive terminal disposed at a second end of said opening, means for forming an arc gap disposed between said terminals, said arc gap forming means comprising an arc gap spacer and an arc electrode having a generally flat portion including opposed first and second generally flat surfaces, said arc gap spacer abutting said first generally flat surface, and an explosive cartridge comprising a head portion and an at least partially flattened elongated body portion, said at least partially flattened elongated body portion abutting said second generally flat surface of said arc electrode.

20. A disconnector as recited in claim 19 wherein said arc gap spacer comprises an electrical resistor.

21. An improved surge arrester disconnector of the type having an insulating housing, an arc gap, an explosive charge and an electrical terminal physically connected to said housing, the improvement comprising a metallic casing containing said explosive charge, said metallic casing having a head portion and an elongated body portion, said elongated body portion having an elongated flattened contacting surface formed along the length of said elongated body portion.

22. A disconnector for a surge arrester comprising an insulating housing having an opening, a first electrically conductive terminal disposed at a first end of said opening, a second electrically conductive terminal disposed at a second end of said opening, means for forming an elongated arc gap disposed between said first and second terminals, said arc gap forming means comprising an arc gap electrode, said arc gap electrode comprising a flat metallic plate, and an explosive cartridge having a metallic casing with a head portion and an elongated body portion, a planar portion of said flat metallic plate being disposed in physical contact with said elongated body portion of said metallic casing along the length of said elongated body portion.

23. A disconnector for a surge arrester comprising an insulating housing having an opening, a first electrically conductive terminal disposed at a first end of said opening, a second electrically conductive terminal disposed at a second end of said opening, means for forming an elongated arc gap disposed between said first and second terminals, said arc gap forming means comprising an arc gap electrode, said arc gap electrode comprising a flat metallic plate, and an explosive cartridge having a metallic casing with a head portion and an elongated body portion, said arc gap electrode being disposed in physical contact with said elongated body portion of said metallic casing, said elongated body portion including an elongated flattened contacting surface formed thereon and said arc gap electrode being disposed in physical contact with said elongated flattened contacting surface.

24. A disconnector as recited in claim 23 wherein the longitudinal axis of said elongated body portion of said metallic casing is parallel to the plane of said flat metallic plate.

25. A disconnector as recited in claim 24 wherein the plane of said flat metallic plate is perpendicular to the longitudinal axis of said arc gap.

26. A disconnector as recited in claim 25 wherein said insulating housing comprises an elongated insulating housing and wherein the plane of said flat metallic plate is perpendicular to the longitudinal axis of said elongated insulating housing.

* * * * *